(12) United States Patent
Rose et al.

(10) Patent No.: US 7,402,808 B2
(45) Date of Patent: Jul. 22, 2008

(54) RADIATION IMAGING SYSTEM AND METHOD

(75) Inventors: James Wilson Rose, Guilderland, NY (US); William Edward Burdick, Jr., Schenectady, NY (US); James Scott Vartuli, Rexford, NY (US); Min-Yi Shih, Niskayuna, NY (US); Samhita Dasgupta, Niskayuna, NJ (US)

(73) Assignee: General Electric Company, Niskayuna, NY (US)

( * ) Notice: Subject to any disclaimer, the term of this patent is extended or adjusted under 35 U.S.C. 154(b) by 58 days.

(21) Appl. No.: 10/815,357

(22) Filed: Mar. 31, 2004

(65) Prior Publication Data
US 2005/0218330 A1 Oct. 6, 2005

(51) Int. Cl.
*G01T 1/20* (2006.01)
(52) U.S. Cl. .............................. 250/368; 374/4; 374/19
(58) Field of Classification Search ................. 250/368; 374/4, 19
See application file for complete search history.

(56) References Cited

U.S. PATENT DOCUMENTS

| | | | | | |
|---|---|---|---|---|---|
| 5,465,284 | A | * | 11/1995 | Karellas | 378/62 |
| 6,310,352 | B1 | * | 10/2001 | Gross et al. | 250/370.11 |
| 6,710,350 | B2 | * | 3/2004 | Ruzga | 250/368 |
| 2002/0117625 | A1 | * | 8/2002 | Pandelisev | 250/368 |

* cited by examiner

*Primary Examiner*—David P. Porta
*Assistant Examiner*—Shun Lee
(74) *Attorney, Agent, or Firm*—Jason K. Klindtworth

(57) ABSTRACT

An imaging system for generating an image of an object is provided. The imaging system comprises an X-ray source disposed in a spatial relationship to the object configured to transmit X-ray radiation through the object. The system further comprises at least one X-ray detecting media configured to convert the X-ray radiation transmitted through the object to optical signals. In addition, the system comprises an optical transmission conduit comprising a first end and a second end and an optical detector configured to convert optical signals to corresponding electrical signals. The first end of the optical transmission conduit is coupled to the X-ray detection device and the second end coupled to the optical detector.

18 Claims, 4 Drawing Sheets

US 7,402,808 B2

RADIATION IMAGING SYSTEM AND METHOD

BACKGROUND OF THE INVENTION

The invention relates generally to imaging systems, and more specifically to a system and method for a radiation imaging system.

Radiation systems like tomosynthesis systems are often used in the field of medicine to generate three-dimensional (3D) images of an object. Typically, tomosynthesis systems include X-ray systems and computer tomography systems. A typical tomosynthesis system comprises an X-ray source, an X-ray detector and a processing circuit. The X-ray source is either stationary or is rotated on an arc and projects X-rays on the object, usually a patient. The X-rays are filtered by a collimator subsequent to passing through the object being scanned. The attenuated beams are then detected by a set of detector elements.

Typically, the detector comprises X-ray detecting media such as scintillators disposed over an optical detector usually comprising an array of photosensitive elements. The attenuated X-ray beams are first detected by the scintillators, which convert the X-ray beams to visible photons. The photosensitive elements detect the visible photons and convert to corresponding electrical signals based on the intensity of the attenuated X-ray beams, and the signals are processed to produce projections. By using reconstruction techniques three-dimensional images are formed from these projections.

One problem with such an arrangement of the detector is the transmission of the electrical signals from the rotating gantry. In particular, maintaining signal fidelity of a large quantity of un-amplified electrical signals in a noisy (EMI, EMC from adjacent motors, fans, etc.) electrical environment presents challenges to the current detector arrangement. In addition, the mechanical aspects of the gantry operation impose vibration and transient acceleration that can further lead to electrical signal degradation (microphonics, et. al.).

Another typical problem with the detector is that the response of the photosensitive elements is temperature-dependent. It would be desirable to design a detector in a way such that the heat produced in the amplification and signal processing components does not affect the performance of the photosensitive elements.

For imaging, it is desirable to transmit a large number of parallel signals, either to accommodate a larger field of view, or to improve resolution through smaller pixel size, resulting in higher quality images. Significant mechanical and electrical challenges are inherent in maintaining signal integrity through the transmission and processing of these parallel signals; In addition, the readout time of image/signal is proportionally increased.

In addition, while designing the detector, great care has to be taken in selecting the scintillator material such that the wavelength of the photons generated by the scintillator matches the peak sensitivity of the photosensitive element. As a result, other scintillator material properties, e.g., conversion efficiency (i.e. gain) and intrinsic decay may be sub-optimal. The opportunity to utilize scintillators that output multiple wavelengths is also limited.

It would therefore be desirable to design an imaging system where the X-ray detecting media can be optimized for its optical performance, manufacturability, and ease of integration with the X-ray imaging system. In addition, it would be desirable to design an imaging system that utilizes optical channels to provide for high signal bandwidth and to eliminate the limitations inherent in traditional electrical interconnect.

BRIEF DESCRIPTION OF THE INVENTION

Briefly, in accordance with one embodiment of the invention a radiation imaging system for generating an image of an object is provided. The radiation imaging system comprises an X-ray source disposed in a spatial relationship to the object and configured to transmit X-ray radiation through the object. The radiation imaging system further comprises at least one X-ray detecting medium configured to convert the X-ray radiation transmitted through the object to optical signals and an optical transmission conduit comprising a first end and a second end. The radiation imaging system further comprises an optical detector configured to convert optical signals to corresponding electrical signals. The first end of the optical transmission conduit is coupled to the X-ray detection device and the second end is coupled to the optical detector.

In another embodiment, a method for generating an image of an object is provided. The method comprises transmitting X-ray radiation through the object at a predetermined location and converting the X-ray radiation transmitted through the object to optical signals. The method further comprises providing an optical transmission path for optical signals to an optical detector, converting the optical signals to corresponding electrical signals, and processing the electrical signals to generate the image.

In an alternate embodiment, a computer tomography (CT) system is provided. The CT system comprises an X-ray source configured to emit a stream of radiation and at least one X-ray detecting media configured to convert the X-ray radiation transmitted through the object to optical signals. The CT system further comprises an optical transmission conduit comprising a first end and a second end. In addition, the CT system comprises an optical detector configured to convert optical signals to corresponding electrical signals, where the first end of the optical transmission conduit is coupled to the X-ray detection device and the second end is coupled to the optical detector.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
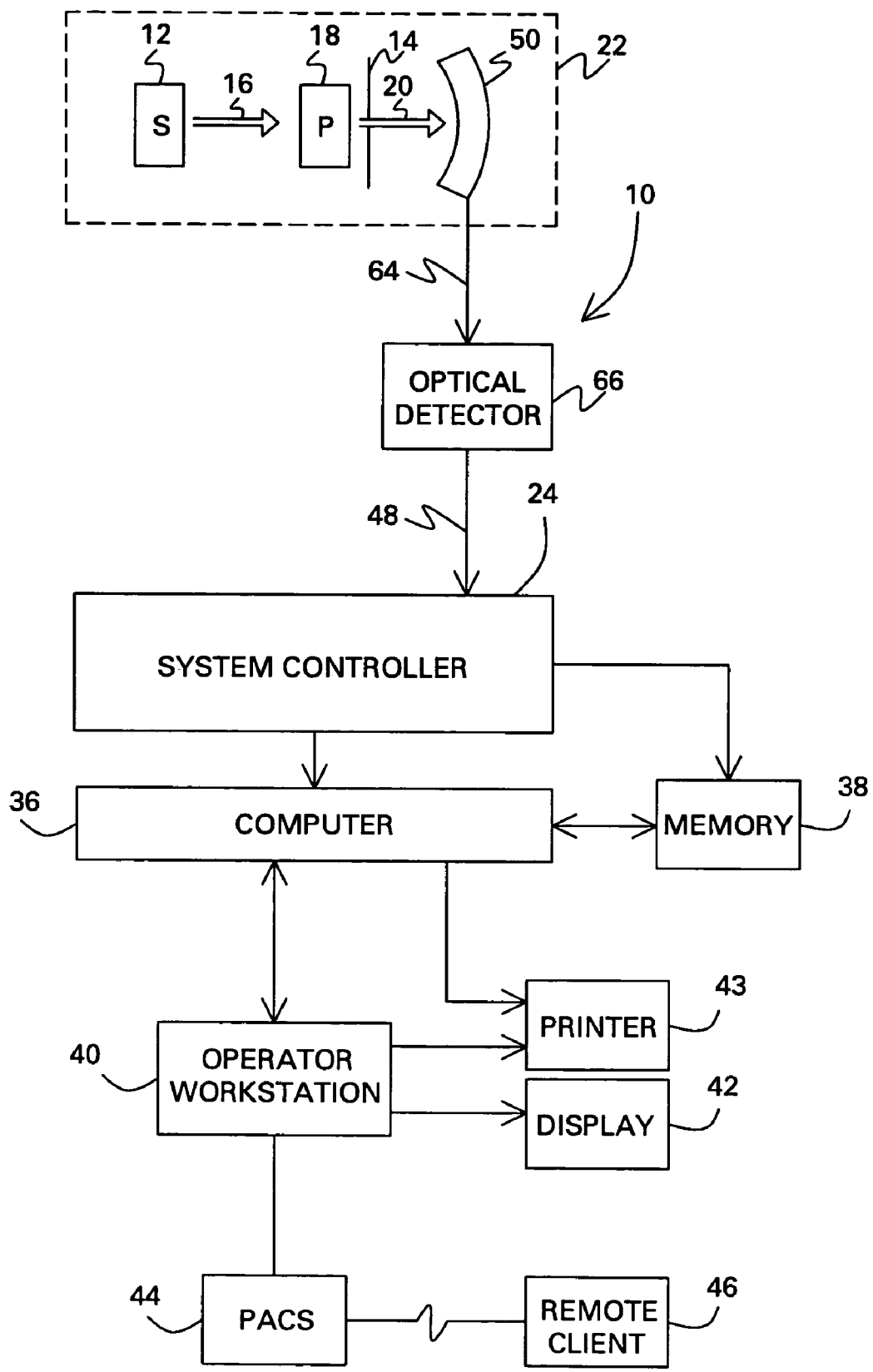
FIG. 1 is a block diagram illustrating one embodiment of an imaging system implemented according to one aspect of the invention.

FIG. 1 illustrates diagrammatically an imaging system 10 for acquiring and processing image data. In the illustrated embodiment, system 10 is a computed tomography (CT) system designed both to acquire original image data and to process the image data for display and analysis in accordance with the present technique. Other imaging modalities, which acquire image data for a volume, may also benefit from the present techniques. The following discussion of CT systems is merely an example of one such implementation and is not intended to be limiting in terms of modality or anatomy.

As used herein, "adapted to", "configured" and the like refer to devices in a system to allow the elements of the system to cooperate to provide a described effect; these terms also refer to operation capabilities of electrical or optical elements such as analog or digital computers or application specific devices (such as an application specific integrated circuit (ASIC)), spatial light modulators, amplifiers or the like that are programmed to provide an output in response to given input signals, and to mechanical devices for optically or electrically coupling components together, such as lens and fiber optic systems.

In the embodiment illustrated in FIG. 1, imaging system 10 includes gantry assembly 22. As used herein, gantry assembly refers to a rotating member with various components including an X-ray source and X-ray detecting media disposed thereon. In one exemplary embodiment, the source of X-ray radiation source 12 is typically an X-ray tube. In one embodiment, the X-ray source 12 moves continuously along a path relative to object 18 and transmits X-ray radiations through different regions of object. In another embodiment, the X-ray source is stationary.

X-ray source 12 generates a stream of radiation 16 that passes into a region in which a object, such as a human patient is positioned. A portion of the radiation 20 passes through or around the subject and impacts collimator 14. Only X-rays that pass through object 18 without being deflected or scattered will also pass through collimator 14 to impact X-ray detecting media, represented by reference numeral 50. X-ray detecting media 50 is configured to convert X-rays to corresponding optical signals, the optical signals being representative of the intensity of the incident X-rays. In one embodiment, the X-ray detecting media comprises a plurality of scintillators (not shown). In one embodiment, the X-ray source and X-ray detecting media are disposed on the gantry assembly. The gantry assembly is configured to rotate about the object being imaged.

The optical signals are transmitted to optical detector 66 via optical conduit 64. In one embodiment, the optical conduit comprises a plurality of optical fibers. Optical detector 66 produces electrical signals that are representative of the optical signals. In one embodiment, optical detector 66 comprises a charge-coupled device (CCD) imager. These signals are acquired and subsequently processed to reconstruct an image of the features within the subject. In one embodiment, the optical signals are transmitted from the gantry assembly to the optical conduit by an optical coupling mechanism. Examples of optical coupling mechanism include lens array, gratings, etc In the embodiment shown in FIG. 1, the optical detector may be located outside the gantry assembly 22. Such an arrangement provides for improved electrical performance through isolation from noise generated within the rotating gantry environment (EMI, EMC, microphonics, etc.). Additionally, this arrangement isolates the optical detector from the X-ray source, decreasing the potential for long-term X-ray damage to the detector.

Source 12 is controlled by a system controller 24, which furnishes both power, and control signals for CT examination sequences. Moreover, optical detector 66 is coupled to the system controller 24, which commands acquisition of the signals generated in the optical detector 66. The system controller 24 may also execute various signal processing and filtration functions, such as for initial adjustment of dynamic ranges, interleaving of digital image data, and so forth. In general, system controller 24 commands operation of the imaging system to execute examination protocols and to process acquired data. System controller 24 also includes signal processing circuitry, typically based upon a general purpose or application-specific digital computer, associated memory circuitry for storing programs and routines executed by the computer, as well as configuration parameters and image data, interface circuits, and so forth.

In the embodiment illustrated in FIG. 1, system controller 24 is coupled to a gantry assembly 22. The system controller 24 may be utilized to control the movement of the gantry assembly 22. The gantry assembly 22 enables the X-ray source 12, collimator 14 and the X-ray detecting media 50 to be rotated one or multiple turns around the object 18.

Additionally, as will be appreciated by those skilled in the art, the system controller may also control X-ray source 12. Particularly, the system controller 24 is configured to provide power and timing signals to the X-ray source 12.

The system controller 24 receives data collected by readout electronics of the optical detector 66. The system controller 24 typically receives signals from the optical detector 66 and transmits the data for subsequent processing by a computer 36. In one embodiment, the output of the detector comprises digital signals.

The computer 36 is typically coupled to the system controller 24. The data collected by the system controller 24 may be transmitted to the computer 36 and moreover, to a memory 38. It should be understood that any type of memory to store a large amount of data may be utilized by such an exemplary system 10. Also the computer 36 is configured to receive commands and scanning parameters from an operator via an operator workstation 40 typically equipped with a keyboard and other input devices. An operator may control the system 10 via the input devices. Thus, the operator may observe the reconstructed image and other data relevant to the system from computer 36, initiate imaging, and so forth.

A display 42 coupled to the operator workstation 40 may be utilized to observe the reconstructed image and to control imaging. Additionally, the scanned image may also be printed on to a printer 43 which may be coupled to the computer 36 and the operator workstation 40. Further, the operator workstation 40 may also be coupled to a picture archiving and communications system (PACS) 44. It should be noted that PACS 44 may be coupled to a remote system 46, radiology department information system (RIS), hospital information system (HIS) or to an internal or external network, so that others at different locations may gain access to the image and to the image data.

It should be further noted that the computer 36 and operator workstation 46 may be coupled to other output devices, which may include standard or special purpose computer monitors and associated processing circuitry. One or more operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

Figure 2:
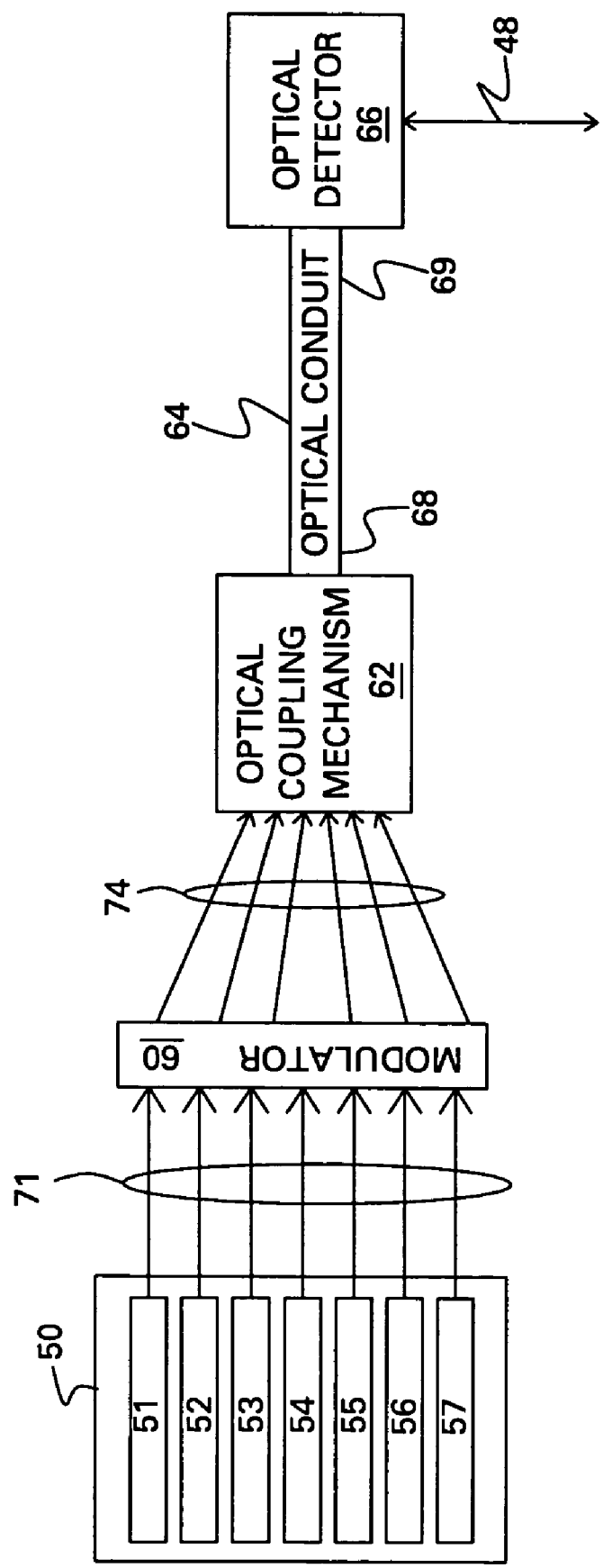
FIG. 2 is a block diagram illustrating one embodiment of a detector implemented according to one aspect of the invention.

FIG. 2 is a detailed diagrammatic view illustrating the X-ray detecting media 50, modulator 60, optical coupling mechanism 62, optical conduit 64 and optical detector 66. Each component is described in further detail below.

X-ray detecting media 50 receives the X-ray radiation transmitted by the X-ray source. In the illustrated embodiment, the X-ray detecting media 50 and the X-ray source are disposed on the gantry assembly 22 of the CT system 10. The X-ray detecting media 50 is configured to convert the X-ray radiation to corresponding optical signals 71. The X-ray detecting media 50 comprises a plurality of scintillators 51-57. The optical signals 71 received from the X-ray detecting media 50 are provided to modulator 60.

Figure 3:
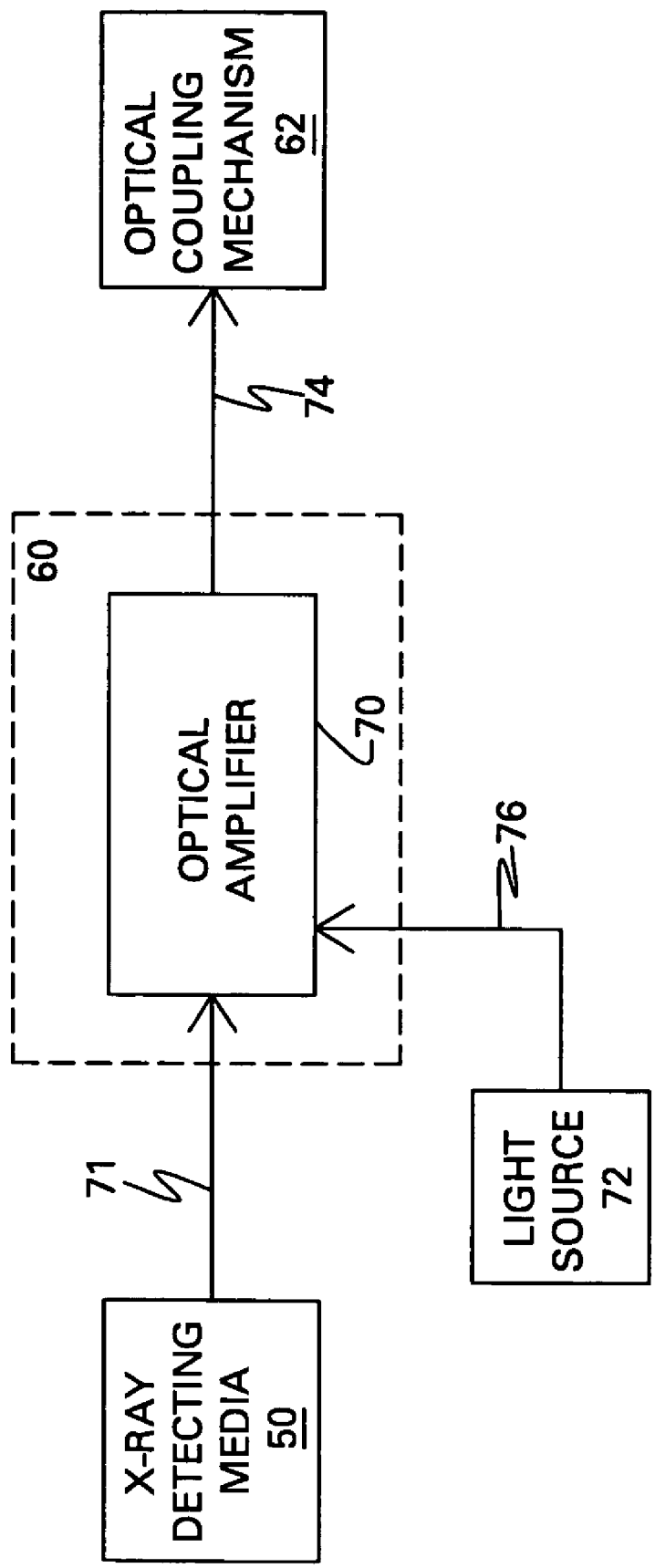
FIG. 3 is a block diagram illustrating one embodiment of a detector implemented according to one aspect of the invention.

Modulator 60 receives optical signals 71 from X-ray detecting media 50 and is configured for transmitting modulated optical signals shown generally with reference numeral 74, through an optical coupling mechanism 62 to optical conduit 64. In one embodiment, the optical coupling mechanism 62 comprises a plurality of lenses arranged in an array and configured for receiving the modulated optical signals 74 from the modulator 60 and directing the optical signals through the optical transmission conduit 64. Other examples of optical coupling mechanism 62 include lens array, gratings, etc As shown in FIG. 3, in one embodiment, modulator 60 comprises an optical amplifier 70. Optical amplifier 70 may comprise a semiconductor optical amplifier, or may be fabricated from other media such as a doped polymer or doped glass material. Optical amplifier 70 receives optical signals 71 from the X-ray media detector 50 and control signals 76 from a light source 72. In one embodiment, light source 72 comprises a laser source. Optical amplifier 70 is configured to amplify the optical signals 71 and generate corresponding modified optical signals 74.

In a further embodiment, optical amplifier 70 is configured to modulate the optical signals 71 and generate corresponding modified optical signals 74. In one embodiment, the optical amplifier 70 is configured to operate in a continuous wave mode where the control signal 76 is a continuous wave. A continuous wave has a constant intensity over a period of time. In another embodiment, the optical amplifier 70 is configured to operate in a pulse-sampling mode where the control signal 76 has variable intensities, over a period of time.

In another embodiment, modulator 60 comprises an optically addressed spatial light modulator. The spatial light modulator comprises a photoconductive layer. The photoconductive layer may comprise a photoconductive material, such as a polymer, semiconductor, glass, or liquid crystal. The photoconductive layer is configured to locally alter conductivities in response to a reception of light from the plurality of scintillators. The spatial light modulator further comprises a light-modulation (either phase, polarization or intensity) layer configured to locally alter polarization factors in response to the corresponding changes in conductivity of the photoconductive layer. As is well known in the art, the altered light-modulation layer can be read out by a sensing device (not shown) and generate a corresponding optical signal. This technique is referred to as optically addressed image conversion.

Referring back to FIG. 2, optical transmission conduit 64 comprises a first end 68 and a second end 69. The first end 68 of the optical transmission conduit 64 is coupled to optical coupling mechanism 62 and receives the modulated optical signals 74 transmitted by modulator 60. The second end 69 is coupled to optical detector 66. In one embodiment, the optical transmission conduit 64 comprises guided optics including optical wave-guides and optical fibers. In another embodiment, the optical transmission conduit 64 comprises free-space optics such as lenses, prisms, and gratings.

Optical detector 66 is configured to convert optical signals to corresponding electrical signals 48. In the illustrated embodiment, the optical detector 66 is located outside the gantry system 22 of CT system 10, shown in FIG. 1. In one embodiment, the optical detector 66 comprises a plurality of photosensitive devices. Examples of photosensitive devices include phototransistors and photodiodes. The electrical signals are then processed to generate the image. In one embodiment, the optical detector is located outside the gantry assembly 22.

Figure 4:
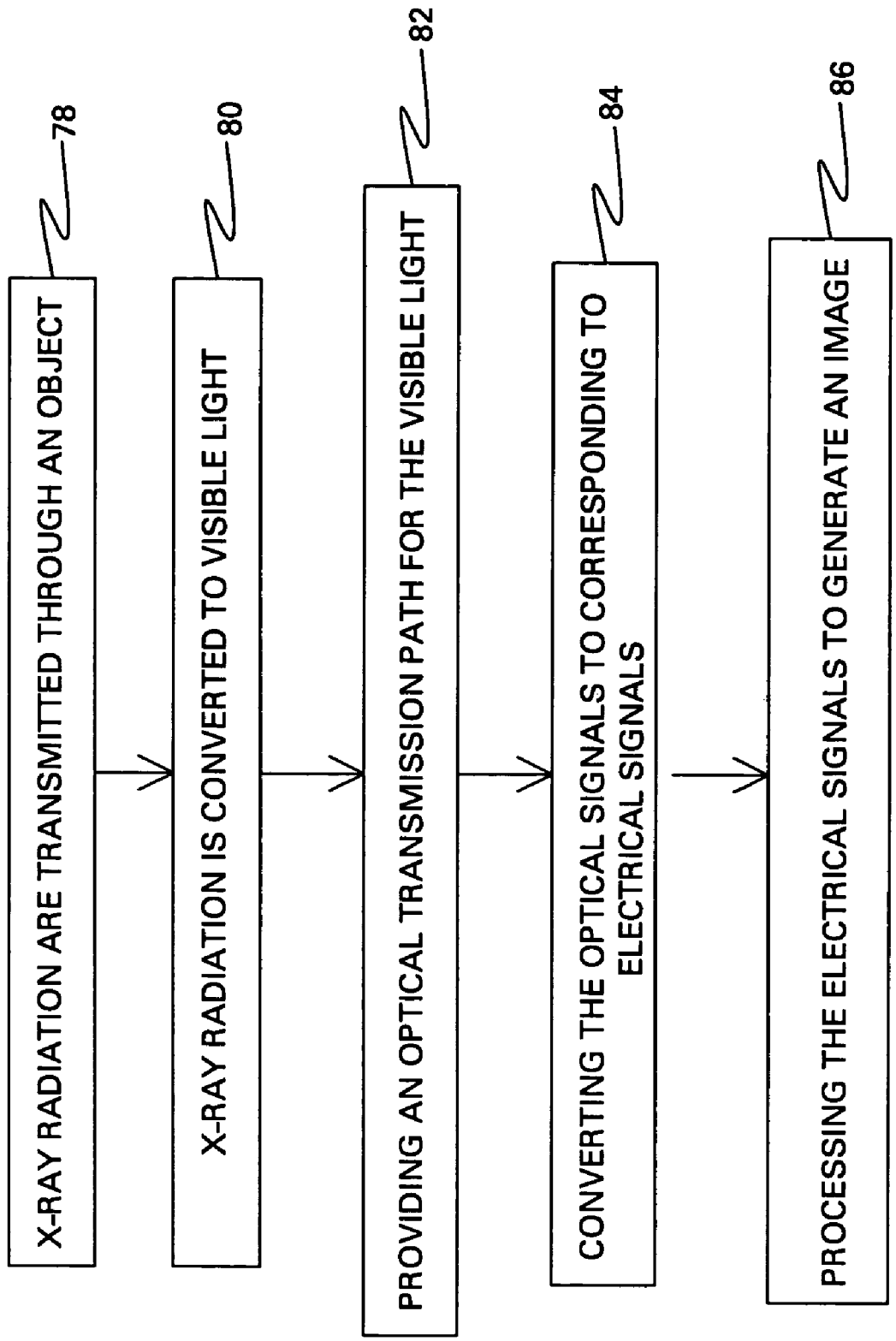
FIG. 4 is a flow chart illustrating one method by which an image is generated using an optical imaging system.

FIG. 4 is a flow chart illustrating one method by which an image is generated, according to an aspect of the invention. Each step in the method is described in further detail below.

In step 78, X-ray radiation is transmitted through the object at a predetermined location. In one embodiment, an X-ray source is configured for generating the X-ray radiation. The X-ray source may be movable or stationary and is disposed in a spatial relationship to the object In step 80, the X-ray radiation transmitted through the object is converted to optical signals. In one embodiment, at least one X-ray detecting media is used for converting the X-rays to optical signals. In a further embodiment, the X-ray detecting media comprises a plurality of scintillators. In one embodiment, the X-ray source and the X-ray detecting media is disposed on the gantry assembly 22 of the imaging system 10 of FIG. 1.

In step 82, an optical transmission path is provided for optical signals to be transmitted to an optical detector. In the present technique, an optical transmission conduit is used. Examples of the optical transmission conduit include optical fibers and optical waveguides. In a further embodiment, an optical coupling mechanism is used to couple the optical signals from the X-ray detecting media to the optical detector. Examples of the optical coupling mechanism include lens arrays, gratings, etc.

In step 84, the optical signals are converted to corresponding electrical signals. In one embodiment, an optical detector is implemented to convert the optical signals to electrical signals. In the present technique, a first end of the optical transmission conduit is coupled to the X-ray detecting media and the second end is coupled to the optical detector, thus providing a path of propagation for the optical signals. The optical detector is located outside the gantry assembly 22 of the imaging system 10 of FIG. 1.

In step 86, the electrical signals are processed to generate the image. In one embodiment, an image processor is used for processing the electrical signals to generate a corresponding image.

The above described embodiments of the invention have many advantages, including providing a higher bandwidth, less radiation damage, and lower noise effects due to the optical conduit separating the X-ray detecting media from the optical detector. Since the optical detector is located outside the gantry system, higher signal performance is achieved. Another advantage of separating the X-ray detecting media from the optical detector is the easy maintenance of the imaging system.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A radiation imaging system for generating an image of an object, the imaging system comprising:

an X-ray source disposed in a spatial relationship to the object configured to transmit X-ray radiation through the object;

at least one X-ray detecting media configured to convert the X-ray radiation transmitted through the object to optical signals;

an optically addressed spatial light modulator configured for modulating the optical signals;

an optical transmission conduit comprising a first end and a second end, and an optical detector comprising a plurality of photosensitive devices and configured to convert each of the optical signals to a corresponding electrical signals; and wherein the first end of the optical transmission conduit is coupled to the at least one X-ray detecting media via the modulator and the second end is coupled to the optical detector.

2. The radiation imaging system of claim 1, further comprising an image processor coupled to the optical detector and configured for processing the electrical signals to generate the image.

3. The radiation imaging system of claim 2, wherein the at least one X-ray detecting media comprises a plurality of scintillators.

4. The radiation imaging system of claim 3, wherein the optical transmission conduit comprises a plurality of guided optics.

5. The radiation imaging system of claim 4, wherein each one of said plurality of guided optics is coupled to a corresponding one of the plurality of scintillators.

6. The radiation imaging system of claim 1, wherein the spatial light modulator comprises:
   a photoconductive layer configured to alter conductivity in response to a reception of light from the plurality of scintillators;
   a light-modulation layer configured to alter a polarization, phase or intensity factor in response to the change in conductivity of the photoconductive layer; and
   a sensing device configured to read the altered light-modulation layer and generate a corresponding optical signal.

7. The radiation imaging system of claim 1, further comprising an optical coupling mechanism configured to enhance a coupling efficiency and for directing the optical signals through the optical transmission conduit.

8. An method for generating an image of an object, the method comprising:
   transmitting X-ray radiation through the object at a predetermined location;
   converting the X-ray radiation transmitted through the object to optical signals;
   modulating the optical signals using an optically addressed spatial light modulator;
   providing an optical transmission path for modulated optical signals to an optical detector; wherein the optical detector comprises a plurality of photosensitive devices;
   converting each of the modulated optical signals to a corresponding electrical signals; and
   processing the electrical signals to generate the image.

9. The method of claim 8, wherein the step of providing the optical transmission path comprises using a plurality of optical fibers and optical waveguides.

10. The method of claim 8, wherein the step of providing the optical transmission path comprises using a plurality of free-space optics.

11. The method of claim 8, further comprising directing the optical signals through the optical transmission path.

12. A computer tomography (CT) system for generating an image of an object, comprising:
   an X-ray source configured to emit a stream of radiation;
   at least one X-ray detecting media configured to convert the X-ray radiation transmitted through the object to optical signals;
   an optically addressed spatial light modulator configured for modulating the optical signals;
   an optical transmission conduit comprising a first end and a second end; and
   an optical detector comprising a plurality of photosensitive devices and configured to convert optical signals to corresponding electrical signals; and wherein the first end of the optical transmission conduit is coupled to the at least one X-ray detecting media via the modulator and the second end is coupled to the optical detector.

13. The CT system of claim 12, wherein the X-ray source and the at least one X-ray detecting media are disposed on a gantry assembly of the CT system, wherein the gantry assembly is configured to rotate about the object being imaged.

14. The CT system of claim 13, further comprising an optical coupling mechanism configured to couple the optical signals generated by the at least one X-ray detecting media disposed on the gantry assembly to the optical conduit.

15. The CT system of claim 14, wherein the optical coupling mechanism comprises a micro-lens array.

16. The CT system of claim 12, further comprising an image processor coupled to the optical detector and configured to process the electrical signals to generate the image.

17. The CT system of claim 12, wherein the optical transmission conduit comprises guided optics.

18. The CT system of claim 12, wherein the optical transmission conduit comprises free-space optics.

* * * * *